Jan. 11, 1944.　　　B. STECHBART　　　2,339,202
PHOTOGRAPHIC CAMERA
Filed Jan. 27, 1941　　　2 Sheets-Sheet 1
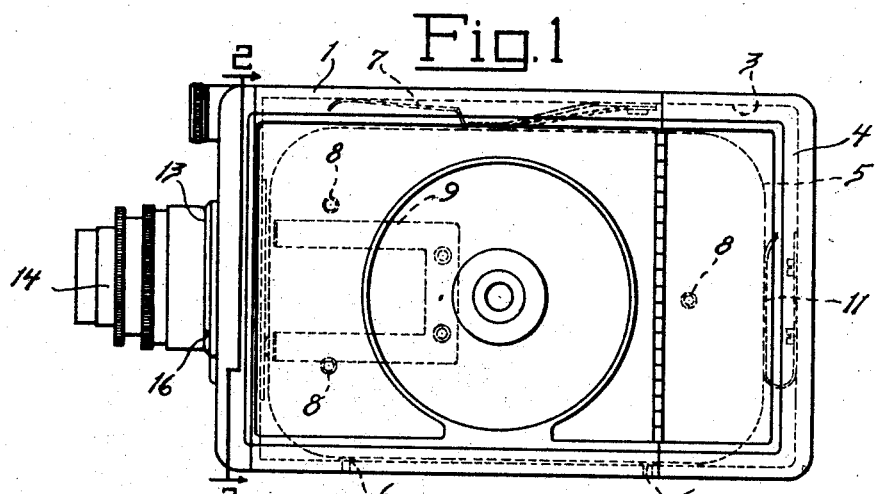
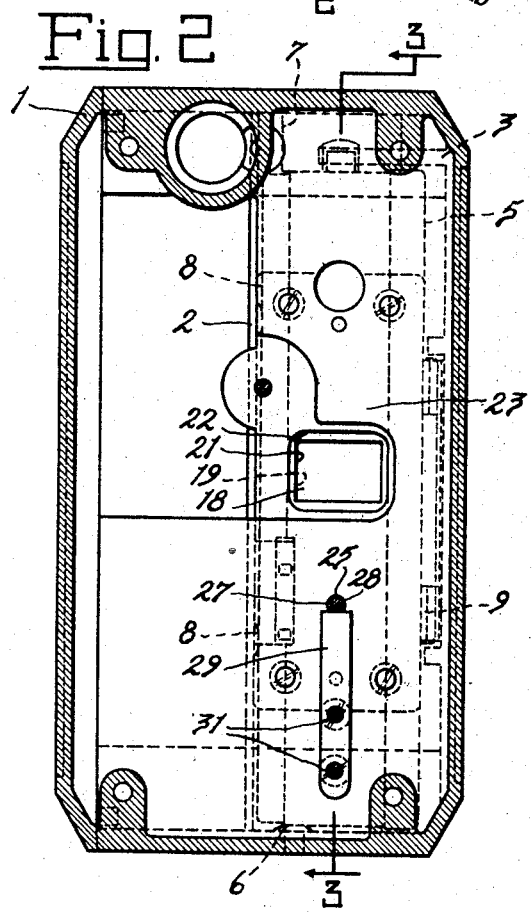
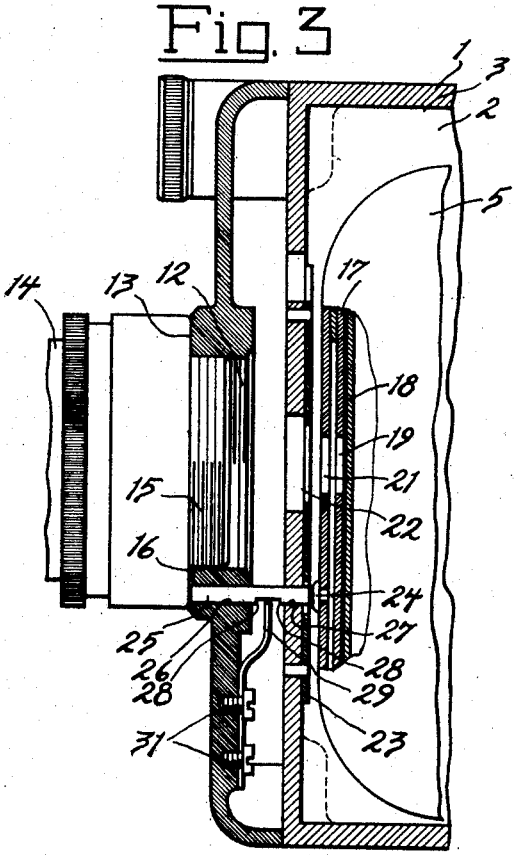
INVENTOR
BRUNO STECHBART
ATTY.

Jan. 11, 1944.   B. STECHBART   2,339,202
PHOTOGRAPHIC CAMERA
Filed Jan. 27, 1941   2 Sheets-Sheet 2
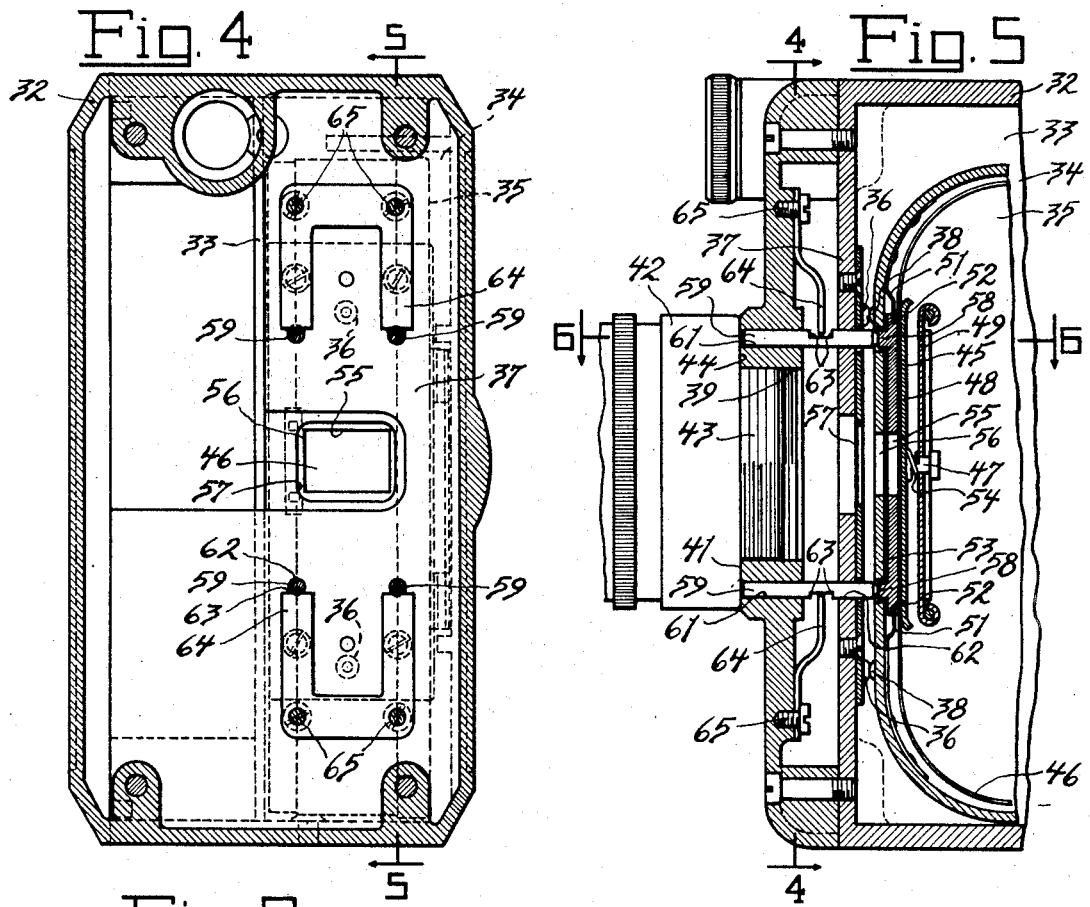
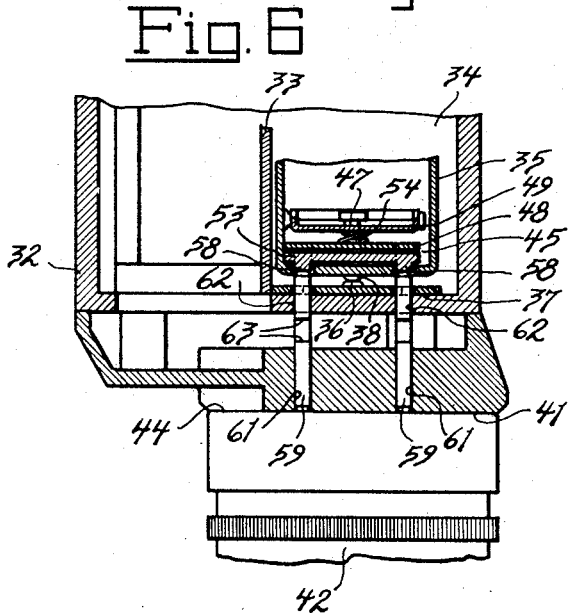
INVENTOR
BRUNO STECHBART
BY Robert F. Miehle, Jr.
ATTY.

Patented Jan. 11, 1944

2,339,202

UNITED STATES PATENT OFFICE 2,339,202

PHOTOGRAPHIC CAMERA

Bruno Stechbart, Chicago, Ill., assignor to The Bell & Howell Company, Chicago, Ill., a corporation of Illinois Application January 27, 1941, Serial No. 376,067

11 Claims. (Cl. 95—45)

My invention relates particularly to photographic cameras of the type involving interchangeable exposure plane forming sensitized photographic member carrying elements, such as exposure plane forming interchangeable film magazines for motion picture cameras.

Such type of camera involves a camera frame element, a photographic lens predeterminately mounted thereon, and an exposure plane forming sensitized photographic member carrying element, such as an exposure plane forming interchangeable film magazine, also predeterminately mounted on the camera frame element in operative relation with the photographic lens.

The primary object of my invention resides in the provision of a simple and effective means concerning a photographic camera of the above type whereby the photographic lens and the exposure plane forming sensitized photographic member carrying element are positioned in accurate operative relation independently of the camera frame element so that manufacturing or mounting inaccuracy with reference to the camera frame element does not cause inaccurate relative positioning of the lens and exposure plane forming element.

With this object in view, my invention consists in certain features of novelty in the construction, combination and arrangement of parts by which the said object and certain other objects, hereinafter appearing, are effected, all as fully described with reference to the accompanying drawings, and more particularly pointed out in the appended claims.

In the said drawings—

Figure 1 is a side elevation of a motion picture camera embodying my invention;

Figure 2 is an enlarged sectional view substantially on the line 2—2 of Figure 1;

Figure 3 is a sectional view substantially on the line 3—3 of Figure 2;

Figure 4 is a sectional view showing another embodiment of my invention and taken substantially on the line 4—4 of Figure 5;

Figure 5 is a partial sectional view substantially on the line 5—5 of Figure 4; and Figure 6 is a partial sectional view substantially on the line 6—6 of Figure 5.

Referring to Figures 1, 2 and 3 of the drawings, 1 designates a camera frame element in the form of a forwardly and rearwardly elongated casing within which is secured a forwardly and rearwardly extending frame plate 2 disposed intermediate the sides of the casing and forming the inner side of a film magazine chamber 3.

The rear portion of the magazine chamber 3 is formed by a cover or door 4 releasably secured in closed position and affording insertion in and removal from the magazine chamber of an interchangeable film magazine 5 in a rearwardly and forwardly disposed interchange path as is usual, see Figures 1 and 2, the magazine being positioned vertically and transversely in the magazine chamber by locating lugs 6 at the bottom of the magazine chamber and engaging upwardly against the bottom of the magazine, a spring 7 at the top of the magazine chamber and bearing downwardly on the top of the magazine, lugs 8 on the frame plate 2 and engaging against a side of the magazine, and a spring 9 at the outer side of the magazine chamber and bearing against the opposing side of the magazine. When the door 4 is closed, a spring 11 on the door yieldably urges the magazine forwardly for predeterminately positioning the magazine forwardly and rearwardly in conjunction with means hereinafter described.

The front wall of the casing 1 is provided with a usual lens mount comprising a screwthreaded bore 12 disposed on a forwardly and rearwardly extending axis and a locating surface 13 surrounding and facing forwardly and axially of this bore. See Figures 1 and 3. A photographic lens 14 is provided with a usual mount structure comprising an axial external screwthread 15 threadedly engageable in the bore 12 and a rearwardly and axially facing locating surface 16 surrounding the screwthread 15 and engageable against the locating surface 13 for the interchangeable predetermined mounting of the lens on the camera casing. As so mounted on the camera casing, the lens is disposed in front of the magazine and the interchange path of the magazine is axial of the lens.

The magazine is provided at the front thereof with a usual exposure apertured film guide, generally designated at 17, which is fixed with the magazine and forms an exposure plane for a sensitized photographic film 18 therein, an exposure aperture 19 of the guide, an opening 21 in the front wall of the magazine, and a light opening 22 in a partition structure 23 of the camera casing between the lens and the magazine, each alining with the lens for exposure of the film at the exposure aperture 19 of the guide.

The front wall of the magazine is provided with a forwardly facing locating lug 24, and a spacing stud 25 is slidably mounted in alined bores 26 and 27, respectively through the front wall of the camera casing and the partition structure 23, in parallelism with the lens mount bore 12 and the axis of the lens and in alinement with the lug 24. See Figures 2 and 3. The spacing stud 25 is thus movable with respect to the camera casing axially of the lens, and is oppositely abuttable with the rearwardly facing locating surface 16 of the lens and with the forwardly facing locating lug 24. Consequently, as the film magazine is installed in the camera casing, the spring 11 urges the magazine forwardly, causing the lug 24 to forwardly abut the spacing stud 25 and causing the spacing stud to abut the locating surface 16 of the lens. As a result, the magazine and the exposure plane forming film guide 17 thereof, are predeterminately located axially of the lens independently of the camera casing, so that manufacturing or mounting inaccuracy with reference to the camera casing does not enter into the predetermined accurate positioning of the magazine and its film guide axially of and with respect to the lens.

The spacing stud 25 is limited in its movement with respect to the camera casing to prevent loss of the stud by means of axially spaced opposing shoulders 28 on the stud and an arm 29 secured on the front wall of the camera casing, as designated at 31, and arranged between these shoulders for alternate engagement therewith.

Referring to Figures 4, 5 and 6 of the drawings, showing another embodiment of my invention, 32 designates a camera frame element in the form of a forwardly and rearwardly elongated casing within which is secured a forwardly and rearwardly extending frame plate 33 disposed intermediate the sides of the casing and forming the inner side of a film magazine chamber 34.

The rear portion of the magazine chamber 34 is formed by a cover or door, not shown but similar to the door 4 of Figures 1, 2 and 3, affording insertion in and removal from the magazine chamber 34 of an interchangeable film magazine 35 in a rearwardly and forwardly disposed interchange path. The magazine chamber 34 is also provided with vertical and transverse magazine locating devices, not shown, similar to the lugs 6, the spring 7, the lugs 8, and the spring 9 of Figures 1, 2 and 3, and is further provided with a spring, not shown but similar to the spring 11 of Figures 1, 2 and 3 and yieldably urging the magazine 35 forwardly. Vertically spaced rearward projections 36 on a partition structure 37 of the camera casing are engaged by forward projections 38 on the front wall of the film magazine for predeterminately positioning the magazine forwardly and rearwardly in conjunction with the aforesaid spring yieldably urging the magazine forwardly.

The front wall of the casing 32 is provided with a usual lens mount comprising a screw-threaded bore 39 disposed on a forwardly and rearwardly extending axis and a locating surface 41 surrounding and facing axially of this bore. See Figures 5 and 6. A photographic lens 42 is provided with a usual mount structure comprising an axial external screwthread 43 threadedly engageable in the bore 39 and a rearwardly and axially facing locating surface 44 surrounding the screwthread 43 and engageable against the locating surface 41 for the interchangeable predetermined mounting of the lens on the camera casing. As so mounted on the camera casing, the lens 42 is disposed in front of the magazine 35 and the interchange path of the magazine is axial of the lens.

The magazine 35 is provided at the front thereof with a usual exposure apertured film guide, generally designated at 45, which forms an exposure plane for a sensitized photographic film 46 therein and which is mounted within the magazine for limited bodily and tilting movement normal to said exposure plane by means of a stud 47 secured centrally on a rear guide plate 48 of this guide and extending through an apertured mounting plate 49 secured within the magazine and oppositely arranged clips 51 engaging shoulder formations 52 at the upper and lower ends of a front guide plate 53 of the guide. A coiled compression spring 54 encircles the stud 47 between the rear guide plate 48 and the mounting plate 49 and yieldably urges the guide 45 forwardly. An exposure aperture 55 of the front guide plate 53, an opening 56 in the front wall of the magazine, and an opening 57 in the partition structure 37 aline with the lens 42 for exposure of the film at the exposure aperture 55 of the guide 45.

The front guide plate 53 is provided with four forwardly projecting locating lugs 58 arranged in angularly spaced relation circumscribing the exposure aperture 55 and the axis of the lens 42 when the magazine is mounted in the camera casing. Four spacing studs 59 are slidably mounted in alined bores 61 and 62, respectively through the front wall of the camera casing and the partition structure 37, in parallelism with the lens mount bore 39 and the axis of the lens, and these studs are arranged in angularly spaced relation circumscribing the axis of the lens and aline respectively with the lugs 58.

The spacing studs 59 are thus independently movable with respect to the camera casing axially of the lens, and are opposite abuttable with the rearwardly facing locating surface 44 of the lens and respectively with the locating lugs 58. Consequently, as the film magazine 35 is installed in the camera casing, the spring, yieldably urging the magazine forwardly, causes the projections 38 to forwardly abut the projections 36 to predeterminately position the magazine, and the spring 54 causes the lugs 58 to respectively forwardly abut the spacing studs 59 and causes the spacing studs 59 to abut the locating surface 44 of the lens. As a result, the exposure guide 45 is predeterminately located axially of the lens independently of the camera casing and the location of the casing of the magazine on the camera casing both with respect to bodily and tilting movement of the exposure guide 45 normal to its exposure plane.

The spacing studs 59 are limited in their movement with respect to the camera casing to prevent loss of the studs by means of axially spaced opposing shoulders 63 on the studs and arms 64 secured on the front wall of the camera casing, as designated at 65, and arranged between these shoulders for alternate engagement therewith.

It is to be noted that in both embodiments limited disengagement of the locating surface of the photographic lens with the locating surface of the camera casing does not interfere with the aforesaid accurate positioning of the exposure guide with the lens.

While I have thus described my invention, I do not wish to be limited to the precise details described, as changes may be readily made without departing from the spirit of my invention, but having thus described my invention, I claim as new and desire to secure by Letters Patent the following:

1. In a photographic camera, the combination with a camera frame element provided with a photographic lens mount, of an exposure plane forming element, and means for positioning said plane forming element on said frame element in exposure relation with a photographic lens on said mount including spacing means operative between said lens and plane forming element axially of said lens independently of and movable with respect to said frame element.

2. In a photographic camera, the combination with a camera frame element provided with a photographic lens mount, of an exposure plane forming element, and means for positioning said plane forming element on said frame element in exposure relation with a photographic lens on said mount including spacing means having opposite abutting relation with a lens on said mount and said plane forming element axially of said lens independently of and mounted on said frame element for movement with respect thereto axially of said lens.

3. In a photographic camera, the combination with a camera frame element provided with a photographic lens mount embodying a locating surface engageable with an opposing axially facing surface of a lens, of an exposure plane forming element, and means for positioning said plane forming element on said frame element in exposure relation with a photographic lens on said mount including a spacing member having opposite abutting relation with said locating surface of a lens on said mount and said plane forming element independently of and mounted on said frame element for movement with respect thereto axially of said lens.

4. In a photographic camera, the combination with a camera frame element provided with a photographic lens mount comprising a screw-threaded bore and a locating surface surrounding and facing axially of said bore for the mounting of a lens provided with an axial external screwthread threadedly engageable in said bore and an axially facing locating surface surrounding said external screwthread and engageable against said first-mentioned locating surface, of an exposure plane forming element, means for positioning said plane forming element on said frame element in exposure relation with a photographic lens on said mount including a spacing stud slidably mounted in a bore of said frame element in parallelism with said first mentioned bore and having opposite abutting relation with said locating surface of a lens on said mount and said plane forming element, said stud being provided with axially spaced opposing shoulders, and an element on said frame element and arranged between said shoulders for alternate engagement therewith to limit axial movement of said stud.

5. In a photographic camera, the combination with a camera frame element provided with a photographic lens mount, of a photographic film carrying magazine provided with an exposure plane forming element, and means for interchangeably mounting said magazine on said frame element with said exposure plane forming element in exposure relation with a photographic lens on said mount including spacing means operative between said lens and exposure plane forming element axially of said lens independently of and movable with respect to said frame element.

6. In a photographic camera, the combination with a camera frame element provided with a photographic lens mount embodying a locating surface engageable with an opposing axially facing locating surface of a lens, of a photographic film carrying magazine provided with an exposure plane forming element, and means for interchangeably mounting said magazine on said frame element with said exposure plane forming element in exposure relation with a photographic lens on said mount including a spacing member having opposite abutting relation with said locating surface of a lens on said mount and said plane forming element axially of said lens independently of and mounted on said frame element for movement with respect thereto axially of said lens.

7. In a photographic camera, the combination with a camera frame element provided with a photographic lens mount, of a photographic element carrying structure comprising a carrying element and an exposure plane forming element mounted on said carrying element for movement with respect thereto normal to said exposure plane, and means for positioning said carrying structure on said frame element with said exposure plane forming element in exposure relation with a photographic lens on said mount including spacing means operative between said lens and said exposure plane forming element axially of said lens independently of and movable with respect to said frame element.

8. In a photographic camera, the combination with a camera frame element provided with a photographic lens mount, of a photographic element carrying structure comprising a carrying element and an exposure plane forming element mounted on said carrying element for bodily and tilting movement normal to said exposure plane, and means for positioning said carrying structure on said frame element with said exposure plane forming element in exposure relation with a photographic lens on said mount including spacing means circumscribing the axis of a lens on said mount and oppositely abuttable with said lens and said exposure plane forming element axially of said lens and in circumscribing relation with said lens axis independently of and mounted on said frame element for movement with respect thereto axially of said lens.

9. In a photographic camera, the combination with a camera frame element provided with a photographic lens mount embodying a locating surface engageable with an opposing axially facing locating surface of a lens, of a photographic element carrying structure comprising a carrying element and an exposure plane forming element mounted on said carrying element for bodily and tilting movement with respect thereto normal to said exposure plane, and means for positioning said carrying structure on said frame element with said exposure plane element in exposure relation with a photographic lens on said mount including a plurality of spacing members arranged in angularly spaced relation circumscribing the axis of said lens and oppositely abuttable with said locating surface of said lens and said plane forming element in circumscribing relation with the axis of said lens independently of and mounted on said frame element for independent movement with respect thereto axially of said lens.

10. In a photographic camera, the combination with a camera frame element provided with a photographic lens mount, of a photographic film carrying magazine comprising an enclosure element and an exposure plane forming element mounted on said enclosure element for movement with respect thereto normal to said exposure plane, and means for interchangeably mounting said magazine on said frame element with said exposure plane forming element in exposure relation with a photographic lens on said mount including spacing means operative between said lens and said exposure plane forming element axially of said lens independently of and movable with respect to said frame element.

11. In a photographic camera, the combination with a camera frame element provided with a photographic lens mount embodying a locating surface engageable with an opposing axially facing locating surface of a lens, of a photographic film carrying magazine comprising an enclosure element and an exposure plane forming element mounted on said enclosure element for bodily and tilting movement with respect thereto normal to said exposure plane, and means for interchangeably mounting said magazine on said frame element with said exposure plane forming element in exposure relation with a photographic lens on said mount including a plurality of spacing members arranged in angularly spaced relation circumscribing the axis of said lens and oppositely abuttable with said locating surface of said lens and said plane forming element in circumscribing relation with the axis of said lens independently of and mounted on said frame element for independent movement with respect thereto axially of said lens.

BRUNO STECHBART.